(12) United States Patent
Bartoloni et al.

(10) Patent No.: US 10,308,788 B2
(45) Date of Patent: Jun. 4, 2019

(54) RUBBER COMPOUND TO PRODUCE TYRES

(71) Applicant: BRIDGESTONE CORPORATION, Tokyo (JP)

(72) Inventors: Alessandra Bartoloni, Rome (IT); Raffaele Di Ronza, Rome (IT)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 233 days.

(21) Appl. No.: 15/312,382

(22) PCT Filed: May 21, 2015

(86) PCT No.: PCT/IB2015/053752
§ 371 (c)(1),
(2) Date: Nov. 18, 2016

(87) PCT Pub. No.: WO2015/177756
PCT Pub. Date: Nov. 26, 2015

(65) Prior Publication Data
US 2017/0081503 A1  Mar. 23, 2017

(30) Foreign Application Priority Data

May 21, 2014 (IT) .............................. RM2014A0260

(51) Int. Cl.
- C08K 3/04 (2006.01)
- C08K 5/378 (2006.01)
- B60C 1/00 (2006.01)
- C08K 3/36 (2006.01)
- C08K 5/372 (2006.01)

(52) U.S. Cl.
CPC ............ *C08K 5/378* (2013.01); *B60C 1/0016* (2013.01); *C08K 3/04* (2013.01); *C08K 3/36* (2013.01); *C08K 5/3725* (2013.01)

(58) Field of Classification Search
CPC .......... C08K 3/04; C08K 3/36; C08K 5/3432; C08K 5/378; C08K 5/3725
See application file for complete search history.

(56) References Cited

U.S. PATENT DOCUMENTS

| | | | |
|---|---|---|---|
| 2,607,776 A | 8/1952 | Vinton | |
| 4,482,663 A * | 11/1984 | Kraus | C08K 5/37 524/493 |
| 2003/0135006 A1 | 7/2003 | Materne et al. | |
| 2014/0371383 A1* | 12/2014 | Hayata | C08K 3/36 524/548 |

FOREIGN PATENT DOCUMENTS

| | | |
|---|---|---|
| JP | 2009-19098 A | 1/2009 |
| JP | 2009-275180 A | 11/2009 |
| JP | 2010-18691 A | 1/2010 |

OTHER PUBLICATIONS

International Search Report for PCT/IB2015/053752 dated Sep. 23, 2015 [PCT/ISA/210].
Written Opinion for PCT/IB2015/053752 dated Sep. 23, 2015 [PCT/ISA/237].

* cited by examiner

*Primary Examiner* — Peter D. Mulcahy
(74) *Attorney, Agent, or Firm* — Sughrue Mion, PLLC

(57) ABSTRACT

A rubber compound comprising at least one polymer base with cross-linkable unsaturated chain, a reinforcing filler, a vulcanization system and an interaction agent between the polymer base and the reinforcing filler consisting of a compound having an amine group and a sulphur atom adapted to react with the polymer base in the vulcanization step. The interaction agent has formula (II) or (III);

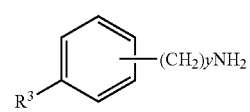

(II)

wherein:
y ranges from 0 to 6
$R^3$ is an aliphatic chain containing sulphur and composed of a number of carbon atoms ranging from 1 to 10;

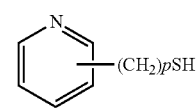

(III)

wherein:
p ranges from 1 to 6.

6 Claims, No Drawings

RUBBER COMPOUND TO PRODUCE TYRES

CROSS REFERENCE TO RELATED APPLICATIONS

This application is a National Stage of International Application No. PCT/IB2015/053752, filed on May 21, 2015, which claims priority from Italian Patent Application No. RM2014A000260, filed on May 21, 2014, the contents of all of which are incorporated herein by reference in their entirety.

TECHNICAL FIELD

The present invention concerns a rubber compound to produce tyres. The compound subject of the present invention is characterised by an improvement of the interaction between the polymer base and the reinforcing filler, whether the latter is carbon black or silicon dioxide.

BACKGROUND ART

As is known, in compounds for tyres the interaction between the reinforcing filler and the polymer base has a direct effect on the physical properties of the vulcanized compounds. In particular, a greater interaction between the reinforcing filler and the polymer base results in greater dispersion of the reinforcing filler in the compound, with consequent improvement in terms of abrasion resistance, resistance to the propagation of cracks and improvement of tension properties. These improvements necessarily result in longer life of the tyre.

To improve the interaction between the polymer base and the reinforcing filler, the use of appropriately functionalized polymer bases is known.

Although said solution improves the interaction between the polymer base and the reinforcing filler, it nevertheless suffers from drawbacks in terms of costs and selectivity. In fact, these functionalized polymer bases are both particularly costly and selective to the type of reinforcing filler used. As is known, the reinforcing fillers generally used in tyre compounds are carbon black and silicon dioxide. According to the type of compound, or its function in the tyre, either carbon black or silicon dioxide or a mixture thereof are used.

A solution which is effective either with carbon black only or with silicon dioxide only is therefore a limiting factor.

The need is therefore felt for a solution that is able to improve the interaction between polymer base and reinforcing filler without the drawbacks of the functionalized polymer bases.

DISCLOSURE OF INVENTION

The subject of the present invention is a rubber compound comprising at least one polymer base with cross-linkable unsaturated chain, a reinforcing filler and a vulcanization system; said rubber compound comprising an interaction agent between the polymer base and the reinforcing filler consisting of a compound having one amine group and one sulphur atom adapted to react with the polymer base during vulcanization; said rubber compound being characterised in that said interaction agent has formula (II) or (III)

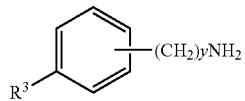
(II)

wherein:
y ranges from 0 to 6
$R^3$ is an aliphatic chain containing sulphur and consisting of a number of carbon atoms ranging from 1 to 10;

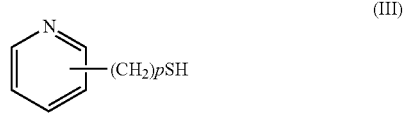
(III)

wherein:
p ranges from 1 to 6.

Here and below, by vulcanization system we mean a complex of ingredients comprising at least sulphur and accelerating compounds which, in preparation of the compound, are added in a final mixing step, and have the purpose of promoting the vulcanization of the polymer base once the compound is subject to a vulcanization temperature.

Preferably, said polymer base is a synthetic polymer; even more preferably said polymer base is a styrene-butadiene or polybutadiene synthetic rubber.

Preferably, said interaction agent is present in the compound in a quantity ranging from 1 to 10 phr.

Preferably, said reinforcing filler is silicon dioxide or carbon black or a mixture thereof.

A further subject of the present invention is a portion of tyre produced with a compound subject of the present invention.

Preferably, said portion of tyre is a tread.

A further subject of the present invention is a tyre comprising at least one portion produced with a compound subject of the present invention.

A further subject of the present invention is the use of a compound as defined above as an interaction agent between the polymer base and the reinforcing filler.

BEST MODE FOR CARRYING OUT THE INVENTION

For a better understanding of the invention, embodiment examples are given below purely for illustrative non-limiting purposes.

EXAMPLES

Two sets of examples were produced distinguished by the different reinforcing filler used. In the first set of examples, silicon dioxide was used, whereas in the second set of examples carbon black was used.

Each of the two sets of examples comprises two examples of the invention and two comparison examples. The examples of the invention (A, B; E, F) are distinguished from one another by the different type and different quantity of interaction agent used. The first of the two comparison examples (C; G) is a compound which differs from the compounds of the other examples of the invention due to the fact that it does not comprise the interaction agent. The second of the two comparison examples (D; H) is a compound that differs from the compounds of the examples of the invention due to the fact that it does not comprise the interaction agent, whereas it comprises a functionalized polymer base according to the solutions of the known art.

The compounds of the examples were prepared according to a standard procedure, which is not relevant for the purposes of the present invention.

—preparation of the compounds—

(1st Mixing Step)

The polymer base, the carbon black or the silicon dioxide together with the silane binder and, at least for the compounds of the present invention, the interaction agent between the polymer base and the reinforcing filler, were loaded, before beginning of the mixing, in a mixer with tangential rotors and internal volume ranging from 230 to 270 liters, reaching a filling factor ranging from 66% to 72%.

The mixer was operated at a speed ranging from 40 to 60 r.p.m., and the mixture formed was discharged once a temperature ranging from 140 to 160° C. had been reached.

(2nd Mixing Step)

The mixture obtained from the previous step was re-processed in the mixer operated at a speed ranging from 40 to 60 r.p.m. and, subsequently, discharged once a temperature ranging from 130 to 150° C. had been reached.

(3rd Mixing Step)

The vulcanization system consisting of sulphur and accelerators was added to the mixture obtained from the previous step, reaching a filling factor ranging from 63 to 67%.

The mixer was operated at a speed ranging from 20 to 40 r.p.m., and the mixture that formed was discharged once a temperature ranging from 100 to 110° C. had been reached. Tables I and II show the compositions of the compounds of the first and second set of examples respectively.

TABLE I

| Compounds | A | B | C | D |
|---|---|---|---|---|
| SBR | 100 | 100 | 100 | — |
| Functionalized polymer base (a) | — | — | — | 100 |
| Silicon dioxide | 78 | 78 | 78 | 78 |
| Silane binder | 8 | 8 | 8 | 8 |
| Formula (II) interaction agent | 4 | — | — | — |
| Formula (III) interaction agent | — | 2 | — | — |
| Sulphur | 2 | 2 | 2 | 2 |
| Accelerator | 3.5 | 3.5 | 3.5 | 3.5 |

TABLE II

| Compounds | E | F | G | H |
|---|---|---|---|---|
| SBR | 100 | 100 | 100 | — |
| Functionalized polymer base (b) | — | — | — | 100 |
| Carbon black | 89 | 89 | 89 | 89 |
| Formula (II) interaction agent | 4 | — | — | — |
| Formula (III) interaction agent | — | 2 | — | — |
| Sulphur | 2 | 2 | 2 | 2 |
| Accelerator | 3.5 | 3.5 | 3.5 | 3.5 |

SBR is a styrene-butadiene synthetic rubber in solution with a mean molecular weight ranging from 800 to 1500× $10^3$ and from 500 to 900×$10^3$ respectively; a styrene content ranging from 10 to 45%, a vinyl content ranging from 20 to 70% and an oil content ranging from 0 to 30%.

The functionalized polymer base (a) consists of an SBR rubber functionalized with carboxylic groups at the chain terminals and having a styrene content ranging from 0 to 40%.

The functionalized polymer base (b) consists of a BR rubber functionalized with amine groups at the chain terminals.

The silicon dioxide used is marketed under the name Ultrasil VN3 GR by the company EVONIK and has a surface area of approximately 170 $m^2/g$.

The silane binder used belongs to the class of polysulfide organosilanes and is marketed under the name SI75 by the company EVONIK.

The carbon black used is N330.

The accelerator used is TBBS.

The interaction agents used are:

the compound of formula (II) is 4-(methylthio)-benzylamine

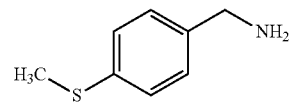

the compound of formula (III) is 2-(mercaptomethyl)-pyridine

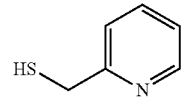

The compounds in Tables I and II were subjected to a series of tests to assess their characteristics. In particular, the viscosity, the chemical bond between the reinforcing filler and the polymer base, the rheometric properties, the dynamic properties and the abrasion resistance were studied.

In particular, the viscosity was measured according to the ASTM 1646 standard, the rheometric properties were measured according to the ASTM D5289 standard, the dynamic properties were measured according to the ASTM D5992 standard, the abrasion resistance was measured according to the DIN 53516 standard, and the chemical bond between the reinforcing filler and the polymer base is indicated by the BOUND RUBBER parameter which is commonly used in literature as an indicator of the polymer-filler chemical-physical interaction; the test is performed on non-vulcanized samples and commonly the fraction of compound which is not solubilized after treatment in THF (24 hours at ambient temperature) is determined.

Tables III and IV show the values of the experimental tests. The values were indexed to the values of the comparison compounds, C and G respectively.

TABLE III

| Compounds | A | B | C | D |
|---|---|---|---|---|
| Bound Rubber* | 105 | 110 | 100 | 110 |
| Viscosity** | 101 | 107 | 100 | 120 |
| t10 | 98 | 101 | 100 | 100 |
| t50 | 105 | 99 | 100 | 100 |
| t90 | 122 | 97 | 100 | 100 |
| E' (0.1%) | 97 | 99 | 100 | 100 |
| E' (4.0%) | 98 | 101 | 100 | 100 |
| Tan δ (60° C.) | 98 | 103 | 100 | 98 |
| Abrasion resistance | 105 | 110 | 100 | 110 |

TABLE IV

| Compounds | E | F | G | H |
|---|---|---|---|---|
| Bound Rubber | 108 | 116 | 100 | 110 |
| Viscosity* | 103 | 110 | 100 | 110 |
| t10 | 109 | 110 | 100 | 100 |
| t50 | 110 | 110 | 100 | 100 |
| t90 | 108 | 107 | 100 | 100 |
| E' (0.1%) | 102 | 104 | 100 | 100 |
| E' (4.0%) | 102 | 104 | 100 | 100 |
| Tan δ (60° C.) | 100 | 101 | 100 | 98 |
| Abrasion resistance | 105 | 110 | 100 | 110 |

(*) the higher the value, the better the result.
(**) the higher the value, the worse the result.

From the data reported in Tables III and IV, it can be seen that the compounds of the present invention have a greater interaction between the polymer base and the reinforcing filler than the comparison compound to which the values are indexed (Compounds C and G). This greater interaction necessarily reflects on the abrasion resistance values.

The data in Tables III and IV also show that the solution adopted by the present invention provides for the same interaction agent to be effective both with the silicon dioxide and with the carbon black, with obvious advantages in terms of productivity.

Furthermore, an improvement can also be noted in the interaction between the polymer base and the reinforcing filler with respect to the comparison compounds comprising the functionalized polymer bases (Compounds D and H). This means that the present invention compared to this solution of the known art not only solves the above-mentioned problems of cost and selectivity of the functionalized polymer bases, but it is also possible to improve the effect of the interaction between the polymer base and the reinforcing filler.

Lastly, it should be underlined that the data reported in Tables III and IV show that the presence of the interaction agent only insignificantly alters the rheometric properties and the dynamic properties of the compound. This evidence may be judged surprising, in particular as regards the rheometric properties, since the interaction agent comprises a sulphur atom adapted to react with the polymer base in the vulcanization step.

The invention claimed is:

1. A rubber compound comprising at least one polymer base with cross-linkable unsaturated chain, a reinforcing filler and a vulcanization system; said rubber compound comprising an interaction agent between the polymer base and the reinforcing filler consisting of a compound having an amine group and a sulphur atom adapted to react with the polymer base in the vulcanization step; said rubber compound being characterised in that said interaction agent has formula (II);

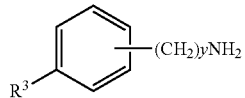

(II)

wherein:
y ranges from 0 to 6
$R^3$ is an aliphatic chain containing sulphur and composed of a number of carbon atoms ranging from 1 to 10.

2. Rubber compound according to claim 1, characterised in that said interaction agent is present in the compound in a quantity ranging from 1 to 10 phr.

3. Rubber compound according to claim 1, characterised in that said reinforcing filler is silicon dioxide or carbon black or a mixture thereof.

4. Rubber compound according to claim 1, characterised in that said interaction agent of formula (II) is 4-(methylthio)-benzylamine.

5. Portion of tyre produced with a compound according to claim 1.

6. Tyre comprising at least one portion according to claim 5.

* * * * *